(12) United States Patent
Moriya et al.

(10) Patent No.: US 6,307,703 B1
(45) Date of Patent: Oct. 23, 2001

(54) MAGNETIC DISK APPARATUS

(75) Inventors: Makoto Moriya; Hiroshi Wakuda, both of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/271,516

(22) Filed: Mar. 18, 1999

(30) Foreign Application Priority Data

Mar. 18, 1998 (JP) .................................................. 10-068428

(51) Int. Cl.[7] .................................................. G11B 21/02
(52) U.S. Cl. ............................ 360/75; 360/69; 360/78.04
(58) Field of Search .................................. 360/75, 69, 60, 360/78.01, 78.04, 78.14

(56) References Cited

FOREIGN PATENT DOCUMENTS

H5-298841    11/1993   (JP) .

*Primary Examiner*—Andrew L. Sniezek
(74) *Attorney, Agent, or Firm*—Brinks Hofer Gilson & Lione

(57) ABSTRACT

After data recording or reproduction is finished, servo control is stopped within a predetermined time to disable a positional compensation output to a head. While servo control is being stopped, servo data recorded in a medium is monitored. When the head is moved on the medium further than a predetermined distance, servo control is activated to start a positional compensation output to the head. The stop/start of the servo control is implemented by software embedded in the CPU of a disk apparatus.

8 Claims, 3 Drawing Sheets

MAGNETIC DISK APPARATUS

BACKGROUND OF THE INVENTION

1. Field of the Invention

The present invention relates to magnetic disk apparatuses in which a magnetic disk is loaded and used, and more particularly, to a magnetic disk apparatus which reduces abrasion caused by a head on a disk surface.

2. Description of the Related Art

Magnetic media such as floppy disks have been used in magnetic disk apparatuses for recording computer data. In recent years, magnetic media with high capacities have been introduced.

In a conventional magnetic disk apparatus, when data is recorded into or reproduced from a medium, a head contacts the medium while the medium is rotating. Even after data recording or reproduction is finished, the head continues to contact the rotating medium.

Therefore, in some magnetic disk apparatuses for high-capacity media, when data recording or reproduction is not performed for a predetermined period of time, the head is moved to a position where a scratch on a medium causes no problem, namely, to an area not to be used on the disk, for example, to the innermost or the outermost side of the disk.

In such a conventional magnetic disk apparatus, however, when data recording or reproduction into or from a medium is requested from the host computer after the head is moved to an area not to be used on the disk, it takes a long time to perform recording or reproduction. To solve this problem, if the head is retracted after a longer time elapses, the probability that the medium will become abraded increases.

In other words, as shown in FIG. 4, even when data is not recorded or reproduced, a head 4 is driven by a driving section 20 that supports the head to compensate for a positional error, and a current flows into the section. If the head 4 vibrates or a mechanical resonance of the head 4 and a suspension 30 occurs, driving the driving section 20 greatly increases the vibration. As a result, abrasion of the medium 1 occurs.

In some magnetic disk apparatuses for high-capacity media, when data recording or reproduction is not performed, a measure is taken in which the head is reciprocated around the target track in order that the same track is not abraded for a long period.

In such a magnetic disk apparatus, however, although abrasion is averaged on the medium 1, a response to a R/W command sent from the user is delayed. If the head vibrates by a small amount in order to solve this problem, a quick response is obtained but the effect of abrasion averaging becomes less effective.

As described above, in the conventional magnetic disk apparatus, the probability that the medium abrades increases an, in the worst case, previously recorded data may be damaged. The period in which the medium can be used becomes short and the medium frequently needs to be replaced with a new one to avoid data loss.

An additional problem is that power consumption is large even when data reading or writing is not performed, since the head is being driven.

SUMMARY OF THE INVENTION

Accordingly, it is an object of the present invention to provide a magnetic disk apparatus which reduces abrasion of a medium caused by a head as much as possible, which prevents the head from being damaged even if an external impact is applied while data recording or reproduction is not performed, and which reduces power consumption.

The foregoing object is achieved according to the present invention through the provision of a magnetic disk apparatus for controlling a head by servo control, for recording data into or reproducing data from a medium, and for performing tracking, wherein, after data recording or reproduction is stopped, servo control is stopped within a predetermined time to stop a positional compensation output to the head to reduce abrasion of the medium.

In the above apparatus, when a predetermined time elapses after data reading or writing is stopped, servo control for the head is stopped. With this operation, the head is released from a condition in which the head vibrates on a medium due to positional compensation. As a result, abrasion of the disk caused by forced vibration (vibration generated by positional compensation) of the head is suppressed as much as possible.

It is preferred that the above apparatus be configured such that servo data recorded in the medium is monitored while servo control is being stopped, and when the head is moved on the medium longer than a predetermined distance, servo control is activated to start a positional compensation output to the head.

As described above, even while servo is being stopped, since servo data recorded in the medium is always monitored, even if an external impact is applied to the magnetic disk apparatus and the head is moved longer than a predetermined distance, in other words, the head is moved outside an area for data use, the head is immediately driven when the head is moved longer than the predetermined distance, to prevent the head from being damaged by an applied large impact.

Servo control can be performed by a linear motor driving apparatus. With the drive of a linear motor, the head can be moved with very high precision.

When servo control is performed by a linear motor, if an external impact is applied while servo control is being stopped, inertia causes the head to attempt to move a long distance. Since a driving force is applied to the head when the head is moved longer than the predetermined distance as described above, the head is prevented from being damaged.

It is preferred that after the predetermined time elapses, when data recording or reproduction is not performed within a certain time, the head be retracted to the innermost side or the outermost side of the medium.

In this case, even if an external impact is applied, the head will not scratch the section of the medium where data recording takes place.

It is also preferred that the stop/start of servo control is processed by software.

As a result, servo control is implemented by a simple program. As compared with a method in which the head reciprocates around the target track, the size of the program can be made small, and thereby the load of the CPU is reduced.

DESCRIPTION OF THE PREFERRED EMBODIMENT

Figure 1:
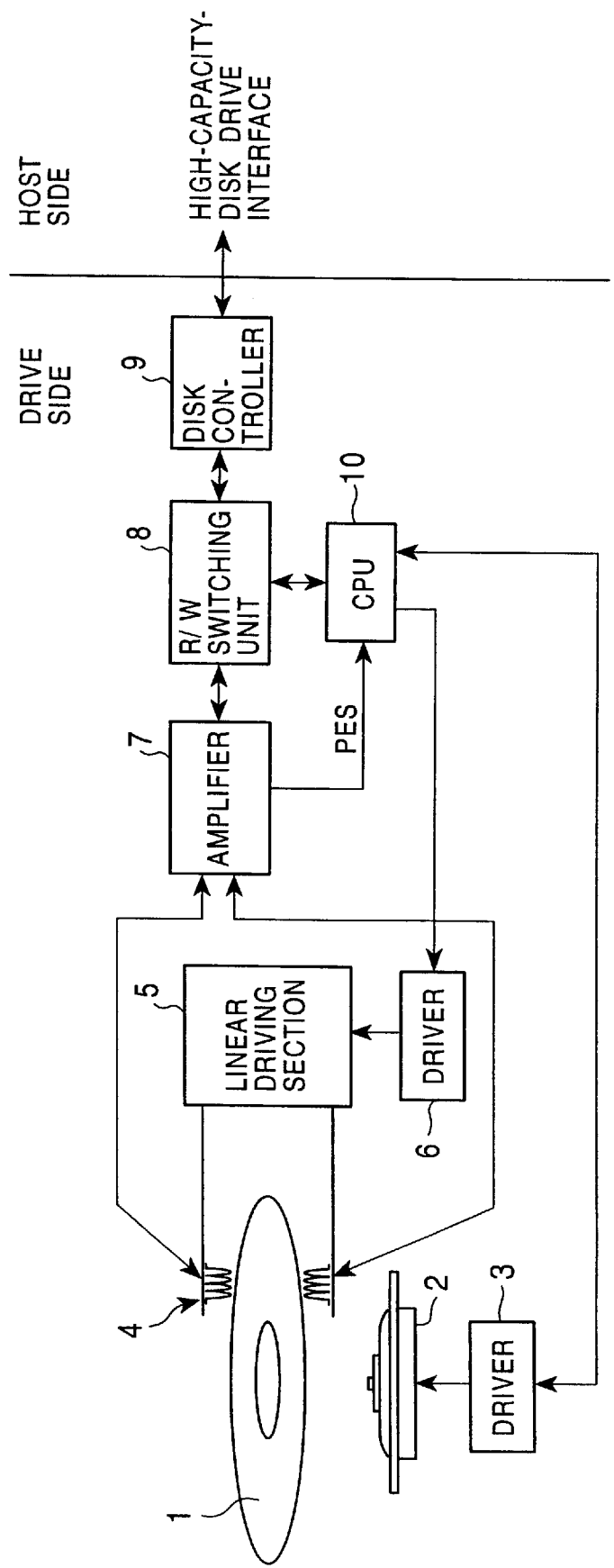
FIG. 1 is a functional block diagram of a magnetic disk apparatus according to the present invention.

A magnetic disk apparatus of the present invention will be described below by referring to the drawings.

Figure 2:
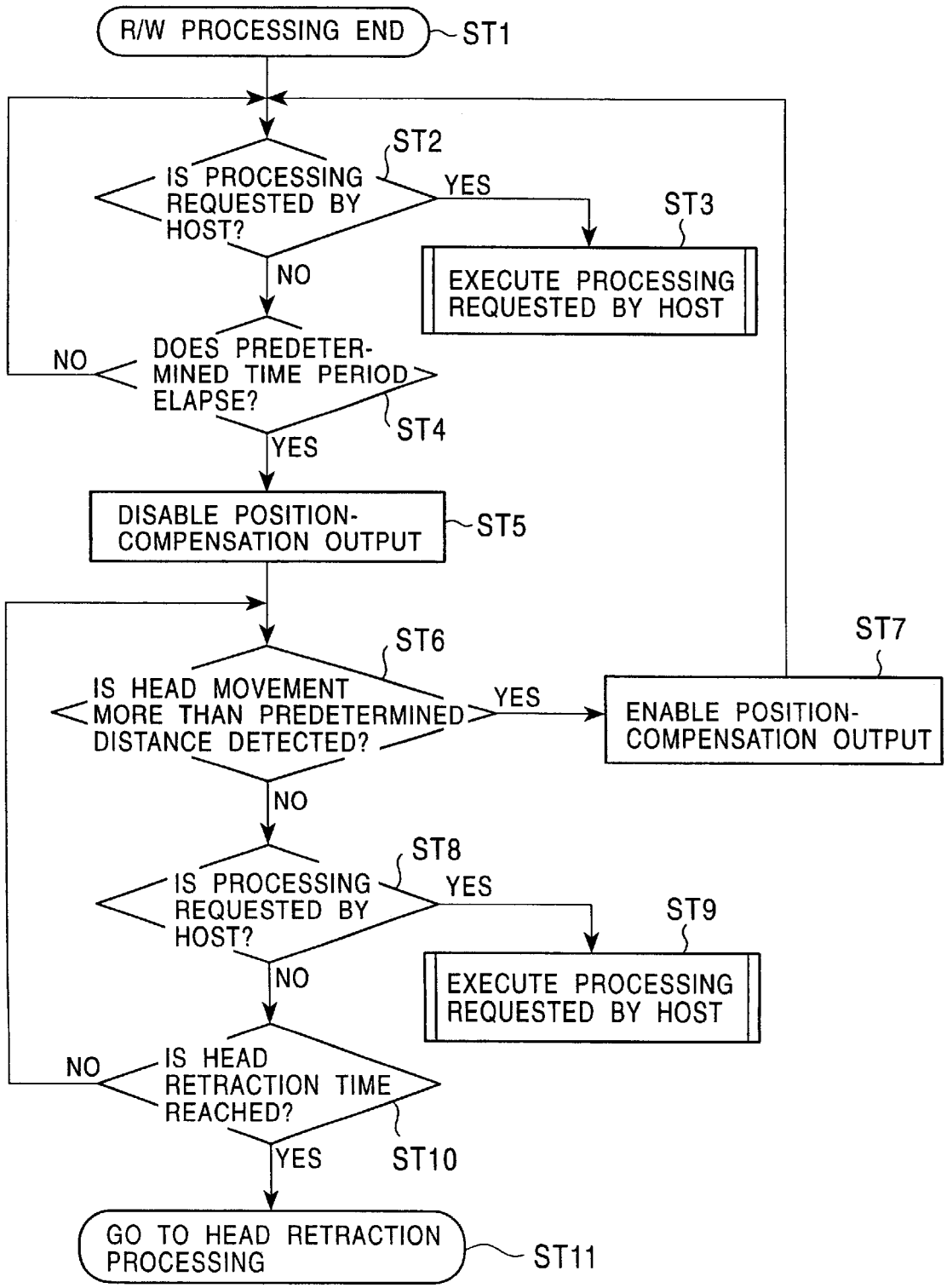
FIG. 2 is a flowchart of a head control method.

FIG. 1 is a functional block diagram of a magnetic disk apparatus of the present invention. FIG. 2 is a flowchart of a head control method.

The magnetic disk apparatus shown in FIG. 1 can perform recording and reproduction into and from a high-capacity medium 1.

When the medium 1 is loaded into the disk apparatus, the medium 1 is disposed on a spindle motor 2. The CPU obtains rotation speed information output from the spindle motor 2 through a driver 3, calculates rotation speed compensation information, and sends it to the driver 3. The driver 3 drives the spindle motor 2 accordingly to rotate the medium 1 at an appropriate speed.

A head 4 is supported by a linear driving section 5, and can be freely moved in the radial direction of the medium 1.

Figure 3:
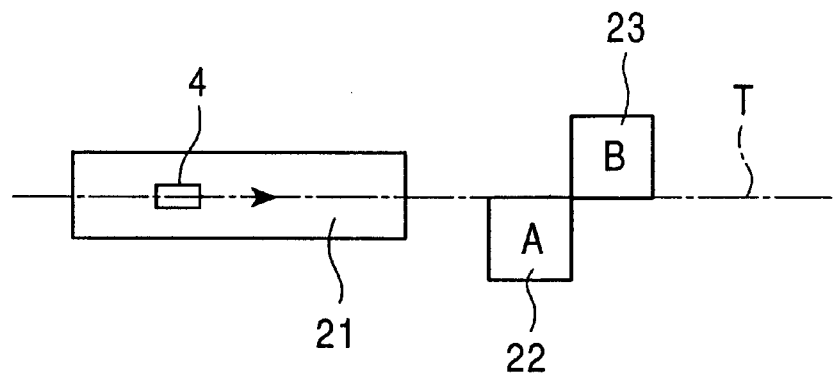
FIG. 3 is a plan showing a servo pattern.
Figure 4:
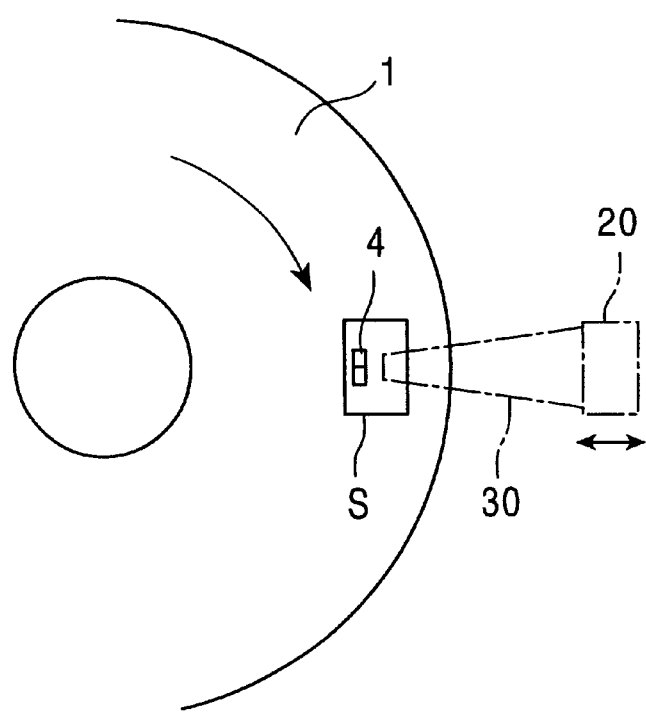
FIG. 4 is a plan showing a condition in which a head is disposed opposite a medium.

As shown in FIG. 3, servo signals indicating positional information are disposed at a plurality of predetermined locations on recording tracks on a recording surface of the medium 1. Each servo signal is formed of an advance-notice signal 21 including a synchronization signal and track number information, and a burst A signal 22 and a burst B signal 23 both indicating positional information in a track. The CPU 10 reads said positional information using amplifier 7 through the head 4 to obtain the track number information and the positional information in a track.

In FIG. 1, the CPU 10 calculates a positional compensation signal from the obtained positional information, and outputs the positional compensation signal to a driver 6 for the linear driving section 5 to control the head 4 in movement.

With the use of a recording command or a reproduction command issued from the host computer, target positional information on the medium 1 is sent to the CPU 10 through a disk controller 9, and recording information is sent to the disk controller 9. The CPU 10 controls the head 4 in movement from the current position of the head 4 to the target position according to the received target positional information. When the head 4 is moved to the target position, the CPU 10 sends a recording enable signal to the disk controller 9. The disk controller 9 then generates a recording format according to the recording information, controls a R/W switching unit 8, and records the recording information into the medium 1 through the amplifier 7 and the head 4.

Even during recording, a reproduction operation is performed at the servo area shown in FIG. 3, the servo area is protected from damage, and positional compensation control continues operating according to the positional information obtained from the servo area. In this case, when a reproduction command is sent from the host computer, after the head 4 is moved to the target position, the disk controller 9 obtains information on the medium 1 through the head 4, the amplifier 7, and the R/W switching unit 8, and outputs it to the host computer.

A head control method will be described next by referring to a flowchart shown in FIG. 2.

When data recording or data reproduction is finished in step 1 (ST1), it is determined whether the host computer requests processing (data recording or reproduction processing) in step 2 (ST2). When it is requested, the processing requested by the host computer is executed in step 3 (ST3).

On the other hand, when it is determined that the host computer has not requested processing in ST2, the elapsed time is calculated from the time when the data recording or reproduction processing is finished, and the processing from ST2 to ST4 is repeated until the elapsed time exceeds a predetermined time.

When it is determined in the step 4 (ST4) that the predetermined time has elapsed, servo control is stopped to disable a positional compensation output in step 5 (ST5).

When it is determined in step 6 (ST6) that the head 4 has moved further than a predetermined distance, namely, the head 4 is moved outside the data area, servo control is again applied to enable the positional compensation output in step 7 (ST7). As a result, the head 4 is prevented from being damaged by a large movement caused by an external impact on the head 4.

On the other hand, it is determined that the head 4 has not moved further than the predetermined distance, a processing request (request for data recording or reproduction processing) from the host computer is monitored in step 8 (ST8). When a processing request is received, the requested processing is executed in step 9 (ST9).

If a processing request is not received from the host computer, the processing from ST6 to ST10 is repeated until the head retraction-time elapses.

When the head retraction-time elapsed in this case, the head 4 is moved to the innermost or outermost side of the medium 1 to reduce abrasion of the medium 1.

The present invention is not limited to the above embodiment. The present invention can be applied to a magnetic disk apparatus obtained by adding a function for reading and writing data into and from a general floppy disk to the high-capacity magnetic disk apparatus shown in FIG. 1. The present invention can also be applied to any magnetic disk apparatus which applies servo control to a head for data reading and writing.

What is claimed is:

1. A magnetic disk apparatus comprising:
   a spindle motor to rotate a medium supported by the spindle motor, the medium having an innermost side and an outermost side and containing servo data having positional information and track number information;
   a first driver to drive the spindle motor;
   a head supported by a linear driving section, the head to read the servo data of a particular location on the medium and record data into or reproduce data from the medium;
   a second driver to drive the linear driving section;
   a CPU to receive the servo data of the particular location on the medium, calculate a positional compensation signal from the positional information, and control the linear driving section, movement of the head controlled by servo control in accordance with the positional compensation signal and target positional information;
   a host computer to issue one of reproduction and recording commands; and
   a disk controller to receive recording information and the one of reproduction and recording commands and transmit the target positional information to the CPU,
   wherein after data recording or reproduction is stopped, said head is substantially maintained at the current head position servo control is completely stopped after a predetermined time correspondingly stopping the positional compensation signal that controls the position of the head to reduce abrasion of the medium.

2. A magnetic disk apparatus according to claim 1, wherein the servo data recorded in the medium is monitored while servo control is stopped, and when the head has unintentionally moved on the medium farther than a predetermined distance, servo control is activated to start the positional compensation signal controlling the position of the head.

3. A magnetic disk apparatus according to claim 2, wherein servo control is performed by a linear motor driving apparatus.

4. A magnetic disk apparatus according to claim 2, wherein, after the predetermined time has elapsed, when data recording or reproduction is not performed within a certain time, the head is retracted to the innermost side or the outermost side of the medium.

5. A magnetic disk apparatus according to claim 2, wherein the start/stop of servo control is processed by software.

6. A magnetic disk apparatus according to claim 1, wherein servo control is performed by a linear motor driving apparatus.

7. A magnetic disk apparatus according to claim 1, wherein, after the predetermined time has elapsed, when data recording or reproduction is not performed within a certain time, the head is retracted to the innermost side or the outermost side of the medium.

8. A magnetic disk apparatus according to claim 1, wherein the stop/start of servo control is processed by software.

* * * * *